United States Patent [19]
Sernovitz

[11] 3,837,667
[45] Sept. 24, 1974

[54] LUGS AND CART THEREFOR

[76] Inventor: Morton A. Sernovitz, 8642 Keystone Ave., Skokie, Ill. 60076

[22] Filed: June 21, 1973

[21] Appl. No.: 372,323

[52] U.S. Cl. ............................................. 280/47.34
[51] Int. Cl. .............................................. B62b 3/00
[58] Field of Search............ 280/47.17, 47.19, 47.34, 280/79.2, 79.3, 47.35; 211/71, 126, 128, 133; 312/351; D12/21–22, 25, 29

[56] References Cited
UNITED STATES PATENTS
2,673,671   3/1954   Williams........................... 280/47.35
3,721,349   3/1973   Jaffe et al. .......................... 211/126

*Primary Examiner*—Duane A. Reger
*Assistant Examiner*—Jesus D. Sotelo
*Attorney, Agent, or Firm*—Harbaugh and Thomas

[57] ABSTRACT

The combination of an open-framed cart and a plurality of containers or lugs, as they are called in this art, is disclosed which fit together in a number of convenient carrying arrangements. The containers have transverse spaced grooves in their bottom surfaces which fit upon and coincide with pairs of longitudinal and transverse frame members of the cart to hold the containers thereon during produce handling procedures. The cart has two tiers in the frame such that each tier can hold one container longitudinally or two containers transversely. The containers also nest in stacked relationship within each other and the longitudinal distance between the bottom grooves of the containers is the same as the transverse distance between their top longitudinal rolled flange edges so that one container will rest on the other in a stable relationship.

10 Claims, 7 Drawing Figures

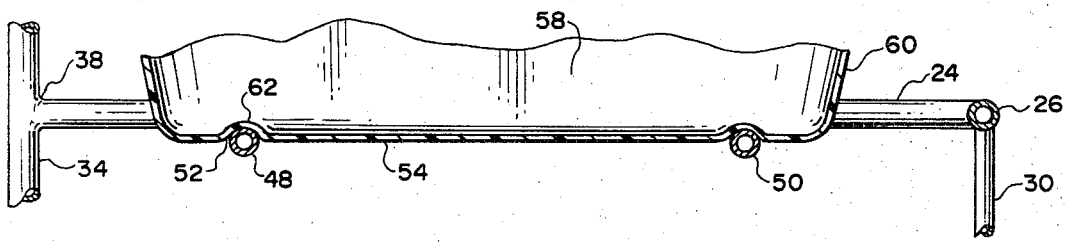
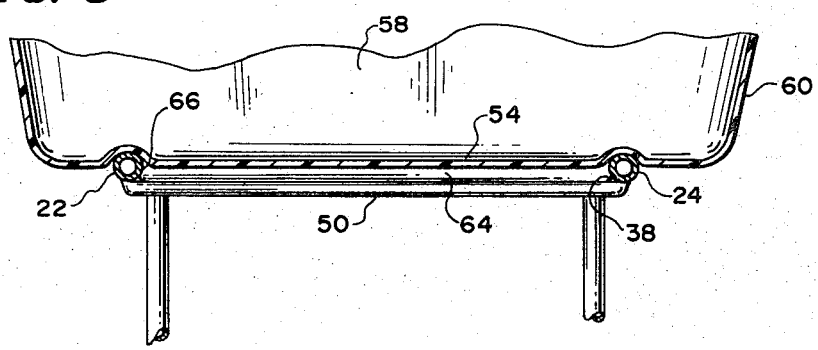
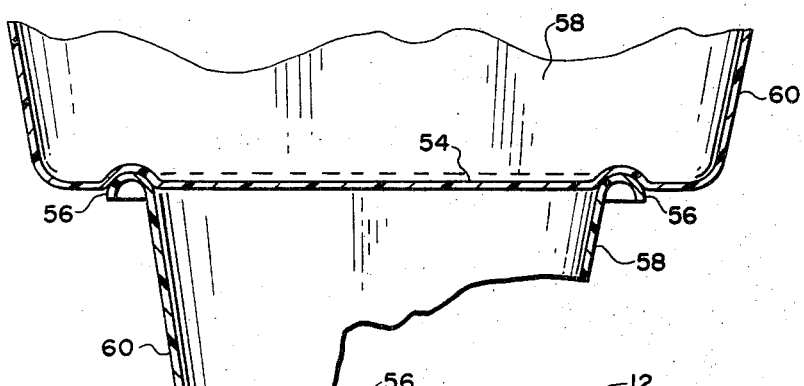
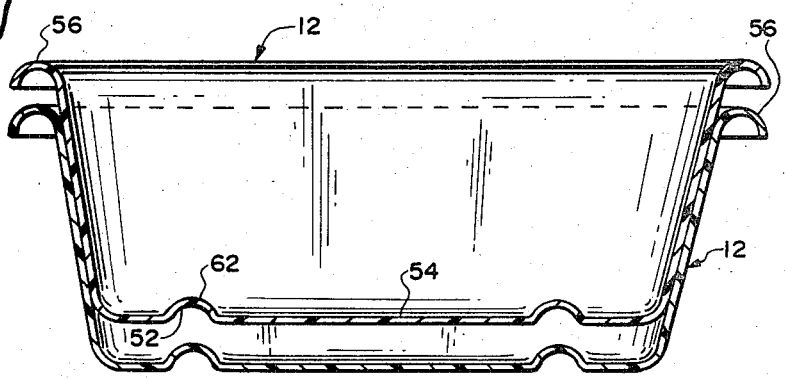

LUGS AND CART THEREFOR

BACKGROUND OF THE INVENTION

Standard carts in this art employ flat shelves upon which containers or lugs may be placed without particular regard to convenience or stability of the load. The containers are not held against displacement from the carts and may be dislodged during use. Both the carts and containers have crevices and corners which become catch-alls for dirt and debris creating unsanitary conditions. There is no coordination of cart size and container size which facilitates use at a work table. Also the containers are awkward to use because they do not nest or sit upon each other with stability.

SUMMARY OF THE INVENTION

In accordance with this invention the dimensions of the lugs for produce have been coordinated with the open structured frame of a cart therefor so that the containers lock or engage upon the frame along two axes as desired. Grooves are provided in the bottoms of the lugs which match the spacing between both longitudinal and transverse members of the cart frame. Thus, a lug may be placed on the cart frame by merely sliding it transversely or longitudinally until the bottom grooves meet with the frame members. Each tier of the frame can hold one lug arranged longitudinally or two lugs arranged transversely or alternatively, one lug on each axis. With one lug in place transversely on the top tier of the frame, the next can be added by merely pushing it against the other, since their engagement with the frame is a sliding mount. The transverse frame members and other parts of the wheel support structure are below the plane of the longitudinal members. Thus, those lugs that are arranged longitudinally are double-locked since both the transverse and longitudinal frame members hold the lugs in place. This provides a versatile cart and lug combination for the holding and transportation of all kinds of articles and the invention has particular utility in the produce art where meat, poultry and other items are moved, stored or displayed. Cross-connection between the bottom of one lug with the top longitudinal flanges of another lug adds to the utility.

DESCRIPTION OF THE DRAWINGS

FIG. 4 is a cross-sectional view taken along the lines 4—4 of FIG. 1;

FIG. 5 is a cross-sectional view taken along the lines 5—5 of FIG. 3;

FIG. 6 is a cross-sectional view of a pair of stacked lugs to show the interlocking of the grooved bottom of one with the top flanges of the other; and FIG. 7 is a cross-sectional view of a pair of nested lugs.

DESCRIPTION OF THE PREFERRED ILLUSTRATIVE EMBODIMENT

Figure 1:
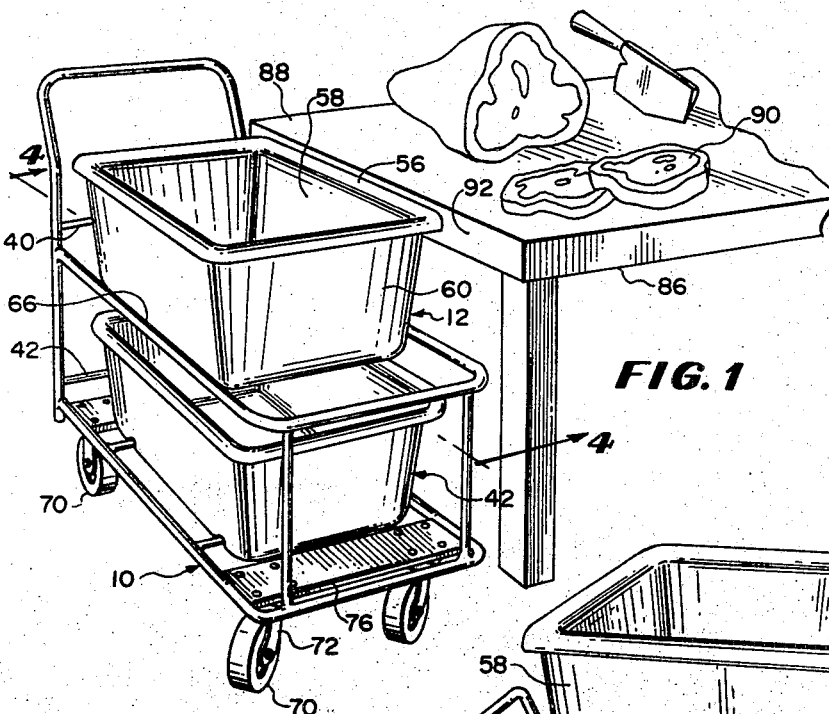
FIG. 1 is an isometric view of a cart with two lugs thereon in longitudinal relationship, set adjacent a work table, only partially shown.
Figure 2:
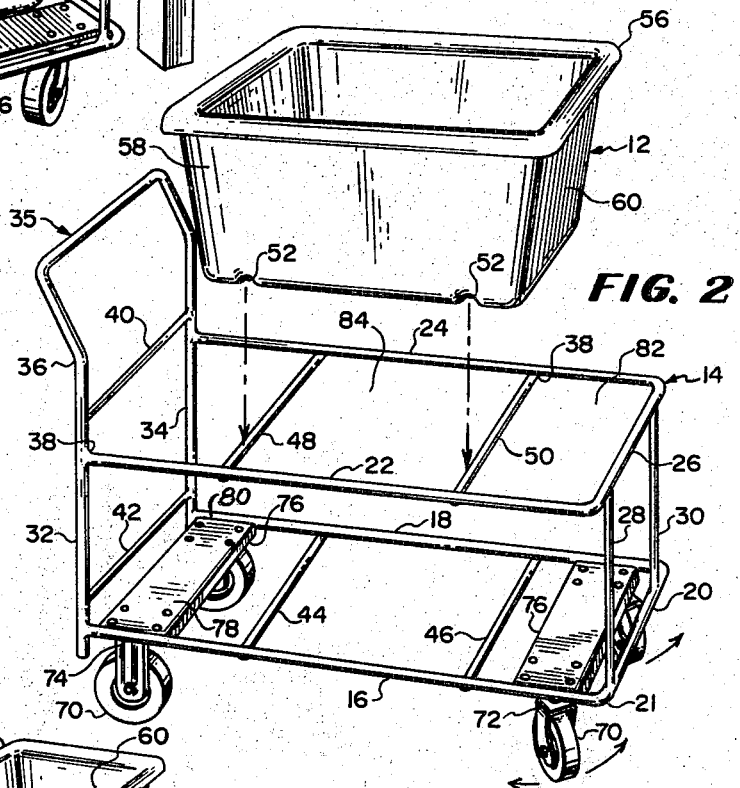
FIG. 2 is an exploded view to show the relationship of the bottom of a lug and the transverse parts of the cart frame.
Figure 3:
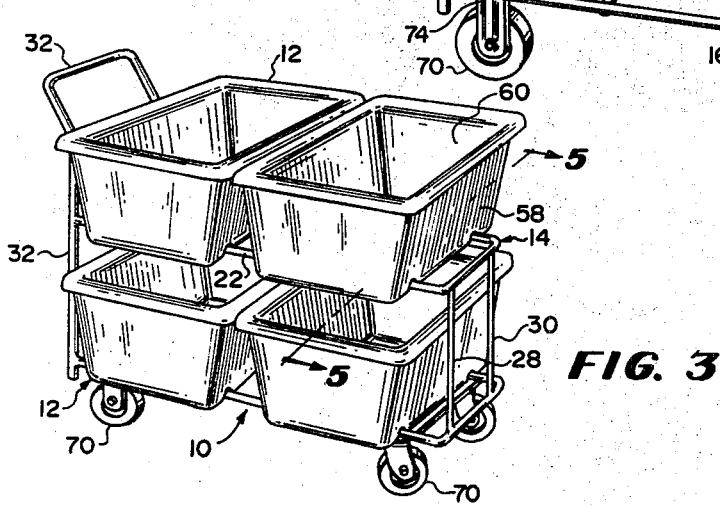
FIG. 3 is an isometric view of the cart with four lugs held thereon in transverse relationship.

Referring first to FIGS. 1, 2 and 3, it is seen that a cart 10 is provided which is capable of carrying one or more containers or so-called lugs 12 in a number of different arrangements. The outer parts of the open structured frame 14 are preferably formed of 1 inch diameter 30 No. stainless steel tubing having a wall thickness of about 0.083 inch for maximum strength and rigidity. The frame 14 includes a bottom shelf or tier comprising the parallel co-extensive and coplanar side members 16 and 18 tied across one end by the lower cross member 20. The members 16, 18 and 20 can be integral as shown and formed into a generally rectangular open structure by forming the corner bends 21 thereon.

The top tier or shelf of the frame 14 includes the identically arranged side members 22 and 24 tied at one end by the cross member 26. This top frame work is similarly formed. These two tiers are held in parallel co-extensive spaced relationship along two axes by means of uprights such as the spaced rods 28 and 30 at one end and the legs 32 and 34 of the U-shaped handle member 35. The handle member is off-set away from the frame by the coordinated bends 36 in each upright leg. The handle member 35 can be one piece or formed of separate pieces as desired. All of the joints, such as indicated at 38, are weldments that have been smoothed, polished and refinished so that no crevices or jagged edges are present. The other end, or handle end of the frame, is cross-braced between its legs by the spaced top and bottom rod members 40 and 42 which are placed sufficiently above the plane of the two respective tiers to form stop members for the lugs 12 as will be described. These rod members may be of lesser diameter than the members forming the main frame and handle member.

The frame 14 and its tiers are completed by the pair of bottom cross supports 44 and 46 and the top cross supports 48 and 50 preferably formed of stainless steel tubing and also of lesser diameter than the other frame members. The top and bottom cross supports are particularly spaced along both the longitudinal and transverse axes of their tiers and attached as at the weldments 38 sufficiently below the top planes of side members 16 and 18, and 22 and 24 so as to engage the spaced transverse groove 52 in the bottom wall 54 of each lug 12 (see FIG. 4). The lowered off-set of the transverse members 16 et seq. allows the bottom wall 54 of a lug 12 to be below the horizontal plane of the side members and provide a rail to retain the lugs against lateral displacement. The frame 14 is longer than the width of two lugs, longer than the length of one lug and slightly wider between its side members than the width of a lug along its bottom wall 54.

Each lug 12 comprises a molded plastic four-walled, open-topped container having an integral, rolled top flange 56 around the periphery. The two sides 58 and the two ends 60 of the lugs taper or flare uniformly outward from the bottom wall to the top flange so that the lugs nest one within the other as shown in FIG. 7. The contour of the grooves 52, which extend the entire width of the lugs, formed by the raised, curved wall 62 is such that they engage over the cross supports 42 and 46 or cross supports 48 and 50 as shown in FIG. 4 and also engage over the side frame members 22 and 24 (or side frame members 16 and 18) as shown in FIG. 5 when the lugs are placed thereon. The contour of the grooves 52 in the bottom 54 of each lug matches the outer contour of each of the side flanges 56 of any other lug.

Accordingly, the cross supports of each tier of the cart 10 can carry a single lug 12 on its cross supports as shown in FIG. 1, the spaced relationship of a lug thereto being shown in FIG. 2, while the supported position is shown in FIGS. 1 and 4.

Referring to FIG. 5 it is seen that the cross support 50 is attached at both ends at the weldment 38 on the bottom side of the side frame members 22 and 24 so that the bottom wall 54 of a lug is above or spaced as at 64 from these cross supports when the lugs are arranged in a transverse carry. This space can be minimal or alternatively the cross support 50 can contact this bottom wall. This offset of the side frame members above the cross supports forms a retaining edge 66 or rail on each side of a lug when it is placed in the longitudinal position shown in FIGS. 1 and 4. The vertical distance between the tiers of the frame 14 is greater than the vertical height of a lug and preferably greater than the vertical height of at least one pair of stacked lugs (FIG. 7) so that placement and removal from the bottom tier is facilitated. Accordingly, each tier of the frame can carry one lug in a longitudinal orientation with adequate room for handling the lugs.

Referring to FIGS. 3 and 5, it is seen that the cart can support one or more lugs in a transverse orientation all of which are stabilized by the interlocking of the grooves 52 on the side frame members 16–18 or 22–24. In this arrangement the length of the frame 14 from the uprights 32–34 to the pair of end members 20 and 26 is about the same as the width of a pair of lugs placed side-by-side.

Any form of wheels 70 to make the cart transportable can be used. In one form the wheels are attached by suitable pivoted forks 72 at one end so as to swivel on a vertical axis and allow steering of the cart. The rear wheels 70 are supported by stationary trunnions 74. Both the forks and trunnions are attached to cross plates 76 front and rear. The top surfaces 78 of the plates are below the plane of the bottom side members 16 and 18 as indicated by the offset 80 (FIG. 2). Thus, the presence of the plates does not interfere with the engagement of the grooves 52 of the lugs with these side members when lugs are placed thereon as shown in FIG. 3 and lateral displacement is mitigated.

In use it has been found that the lugs engage in proper position by merely sliding them across the tiers into the orientation desired, since the spaces 82 and 84 are smaller than the smallest dimension of a lug and its overhanging flange. The space between the top flange 56 of a lug on the bottom tier and the bottom of the frame members of the top tier is such as to make placement and removal of the lugs easy. This space is of course a matter of choice and is preferably more than the total height of two or three nested lugs so that a greater number of empty lugs can be carried on the bottom tier.

It is to be observed that the bends 36 in the handle 35 are at a height above the top tier such that in longitudinal loading (FIG. 1) or in the transverse loading (FIG. 3), the adjacent edge of the lug is clear for grasping by the user's hand. The width of a lug is greater at the top flange 56 than the transverse spacing of the handle uprights 32–34 so that either these members or the end cross members 40 and 42 prevent the lugs from displacement by a sudden shove of the cart. In the transverse loaded position (FIG. 3) the side flange of the adjacent lug is stopped against the uprights 32 and 34 or the hand in the handle. The cart carries the lugs at the proper height to a produce work table 86 (FIG. 1) such that the top flange 56 of an upper lug is level with or just below the table surface 88 to facilitate sliding produce pieces 90 in process from the table into the top lug. This top lug overhangs sufficiently to be place in contact with the edge 92 of the table so that smaller items can be swept into the lugs.

For sanitary purposes in food handling, a solid welded structure for the frame 14 is preferred. However, it is apparent that the cart 10 need not be so constructed and the cross supports 44, 46 or 48 and 50 can be made to adjustably engage the respective side members of the frame. By this arrangement more than two such cross supports can be used depending on the bottom groove configuration of the lugs. Also, the frame members 22 and 24 may be made to telescope if desired, so that the length of the cart is subject to adjustment. The length of the frame can be long enough to accommodate three lugs set transversely on a tier in the manner of FIG. 3. In placing the lugs into the transverse position the cross members 44–46 and 48–50 form a convenient slide to support the end edge or cover of a lug as it is moved into place. The plates 76 also aid in this regard.

A number of lugs can be brought to the work table and stacked nearby in the relationship shown in FIG. 7. The cart is placed adjacent an edge of the table and the top tier is used to support one or more lugs to receive the produce as it is processed. One lug can be used for finished pieces of produce while the other is used to receive the trimmings. As the lugs are filled, they are placed on a bottom tier until the cart is loaded.

Accordingly, this invention provides a box-like frame that is coordinated with the lugs to receive same in two axial orientations, singly or in pairs. The frame is provided with side and cross members which engage transverse grooves or flanged edges in the bottom of the lugs so that displacement of the lugs is mitigated and placement or removal of the lugs from the frame is facilitated.

It is apparent that various changes in construction can be made. Any number of grooves can be used in the bottom of the lugs to cooperate with the frame. Instead of a pair of grooves the bottom area between the grooves 52 can be co-planar with the tops of the grooves to form a single wide depression. The grooves 56 can be above the bottom plane of the bottom as illustrated or defined between a pair of parallel spaced ridges that are molded in reverse to the wall 62 shown. The grooves can be formed by attaching longitudinally split tubular pieces to the planar bottom of a lug. The grooves do not have to be coextensive with the supports on which they rest, that is, discontinuous grooves formed in protruding bosses or legs can be used.

The grooves need not be concentric with the frame parts at their areas of contact. Likewise, the curvature of the flanges 56 (we have used 56 as grooves — which is right) and the grooves 52 may not conform exactly.

The cart can be fabricated with the swivel mounts 72 at all four corners or with a swivel mount at each corner along one side rather than at an end of the frame, with the handle 35 placed along the opposite side instead of at an end. Additional functional or non-functional side members or transverse members can be used in the frame. The lugs can be square or circular as desired. The width of the end walls 60 can be greater than the horizontal placement of the side member 16–18 and 22–24 in which event one or more longitudinal grooves to match this placement can be molded into the bottom wall 54. In this embodiment the pair of longitudinal grooves and the pair of transverse grooves will of necessity intersect and overlap so that they define a square there-between with the longitudinal grooves.

What is claimed is:

1. A lug cart comprising:
   a frame member;
   wheels carrying said frame member for transport;
   said frame member including a bottom and a top tier spaced one above the other;
   said tiers each including parallel spaced side members and a pair of parallel spaced cross members;
   said cross members being below the plane of said side members;
   said side members being longer than said cross members and spaced from each other substantially the same distance transverse said frame as said cross members are spaced from each other along the longitudinal axis thereof.

2. A lug cart in accordance with claim 1 including a lug for use therewith;
   said lug comprising an open-topped container having spaced side and end walls connected by a bottom wall;
   the space between said side members of said cart being greater than the width of said bottom wall along one dimension;
   said bottom wall including protuberances on the underside extending parallel with said one dimension and spaced so as to engage over corresponding sides of said side members of said frame in a transverse position and so as to engage over corresponding sides of said cross members in a longitudinal position below the plane of said side members whereby at least one lug can be carried upon each of said tiers upon said cross members in a longitudinal disposition and at least two lugs can be carried upon each of said tiers in a transverse disposition.

3. A lug cart in accordance with claim 2 in which said protuberances are defined by grooves in the bottom wall of said lug members engageable on a side of said side and cross-members of said tiers.

4. A lug cart in accordance with claim 2 including:
   a pair of said lugs;
   each of said lugs being substantially identical molded plastic containers having a peripheral outwardly extending flange along the top edge of said side and end walls; and
   the contour of said flange and the width between opposite side walls conforming to the contour of said protuberances and their longitudinal spacing whereby one lug can be placed upon the other lug with the bottom wall of the former locked upon the flanges of the latter.

5. A mobile lug cart and lug combination comprising:

a frame member;
   said frame member having a bottom and a top tier spaced one above the other;
   said tiers each including parallel spaced side members and a pair of parallel spaced cross-members intermediate the ends thereof and below the plane of said side members;
   said side members being longer than said cross members and spaced from each other substantially the same distance transverse said frame as said cross-members are spaced from each other along the longitudinal axis thereof;
   at least four identical lug members each comprising an open-topped container having spaced side and end walls connected by a bottom wall;
   the space between said side members being greater than the width of said bottom walls of said lug members;
   said bottom walls of each of said lug members each including protuberances on the underside spaced so as to engage over corresponding sides of said side members of said frame in a transverse position and so as to engage over corresponding sides of said cross-members in a longitudinal position below the plane of said side members;
   the space between said tiers being greater than the height of said lug members whereby each tier will carry one of said lug members in a longitudinal position on said cross-members and two of said lug members in a transverse position on said side members.

6. A mobile lug cart in accordance with claim 5 in which:
   said protuberances are defined by grooves in the bottom wall of said lug members engageable on a side of said side and cross-members of said tiers.

7. A mobile lug cart in accordance with claim 5 in which:
   each of said lugs being substantially identical molded plastic containers having a peripheral outwardly extending flange along the top edge of said side and end walls; and
   the contour of said flange and the width between opposite side walls conforming to the contour of said protuberances and their longitudinal spacing whereby one lug can be placed upon the other lug with the bottom wall of the former locked upon the flanges of the latter.

8. A mobile lug cart in accordance with claim 7 in which said protuberances are defined by spaced parallel grooves having a contour which conforms with the contour of the top portion of said side frame members and said cross-members.

9. A mobile lug cart in accordance with claim 5 having a handle member at one end with spaced legs attached to each of the pairs of side members of said top and bottom tiers; and
   a pair of spaced upright support members connected between the other end of said side members.

10. A mobile lug cart in accordance with claim 9 in which a cross member is provided between said spaced legs above the plane of said side members.

* * * * *